United States Patent [19]

Jenkins, Jr.

[11] 4,158,205

[45] Jun. 12, 1979

[54] RECORD SPOOL HOLDER

[75] Inventor: Leonard E. Jenkins, Jr., Denver, Colo.

[73] Assignee: Honeywell Inc., Minneapolis, Minn.

[21] Appl. No.: 891,080

[22] Filed: Mar. 29, 1978

[51] Int. Cl.² .............................................. G01D 15/28
[52] U.S. Cl. .................................. 346/136; 242/71.9; 242/73
[58] Field of Search ................ 346/136; 242/71.9, 73, 242/76; 226/196

[56] References Cited

U.S. PATENT DOCUMENTS

| | | | |
|---|---|---|---|
| 741,463 | 10/1903 | Courville | 242/71.9 |
| 2,766,096 | 10/1956 | Rountree | 346/136 |
| 3,773,273 | 11/1973 | Gosnell | 242/71.9 |

Primary Examiner—Joseph W. Hartary

Attorney, Agent, or Firm—Laurence J. Marhoefer; Lockwood D. Burton

[57] ABSTRACT

A recording apparatus has accommodations for receiving and retaining a spindle for a roll or spool of recording media. The spindle is characterized in that it has a shoulder at one end constituting a stop guide for a roll of recording medium of a first width. The spindle is also provided with a retractable stop member which, when extended, comprises a stop guide for a roll of recording medium of a predetermined narrower width. The spindle is contoured to firmly engage the core of a roll of recording medium at about the mid point of the width dimension. The selected stop guides provide means for effectively centering either of the two widths of recording medium with respect to the spindle and, hence, the recording apparatus.

8 Claims, 10 Drawing Figures

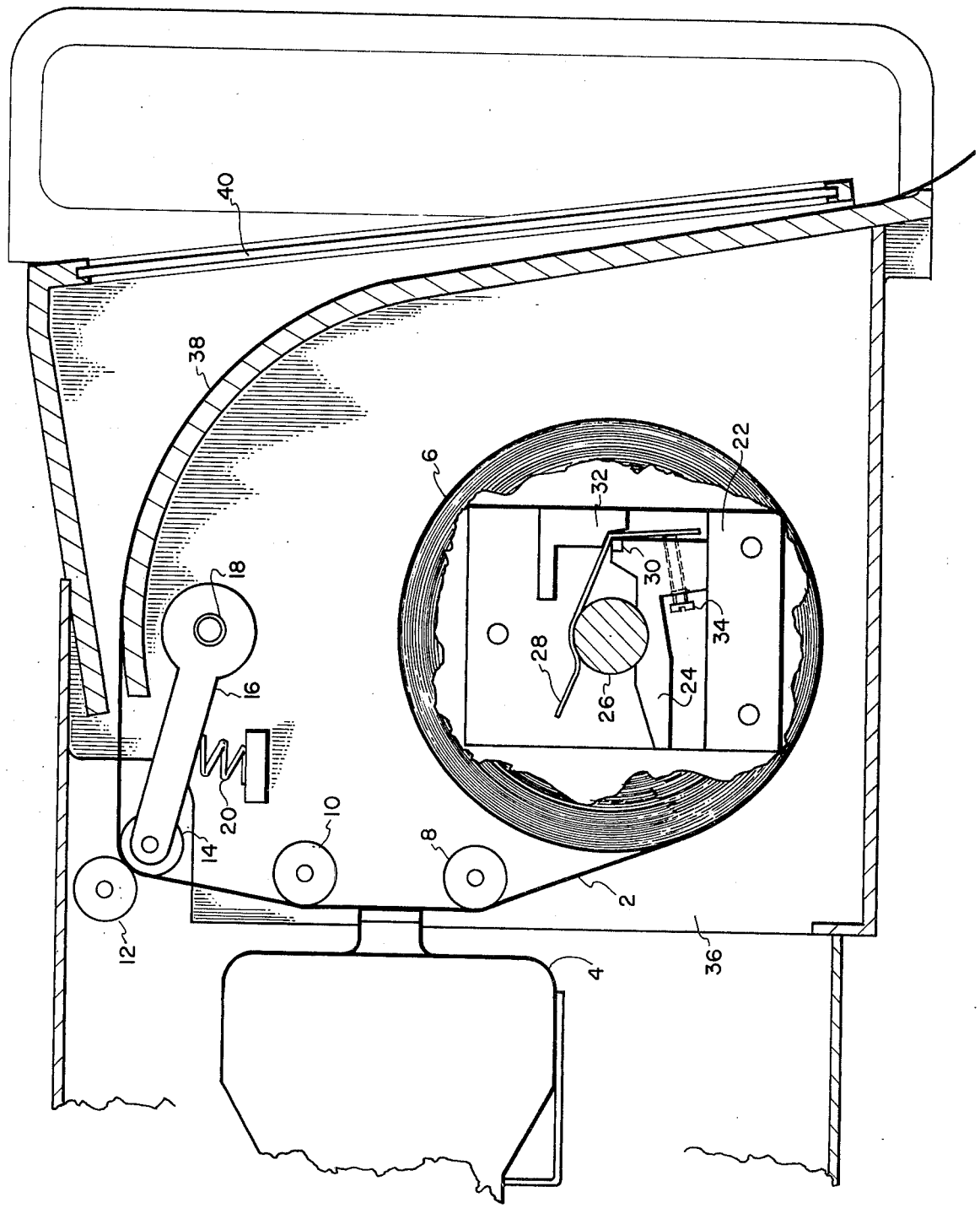

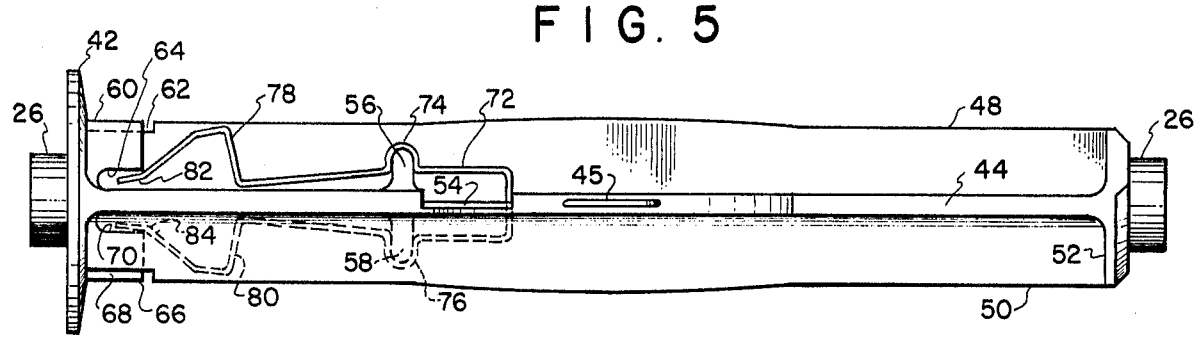
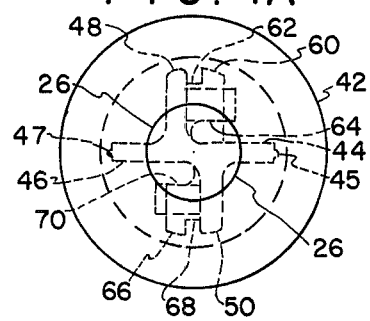 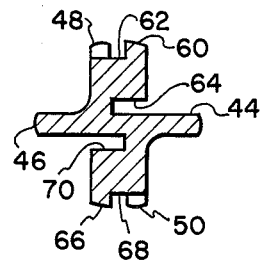 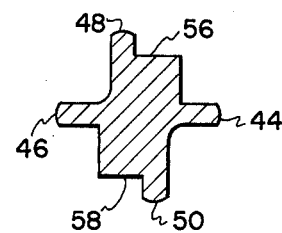
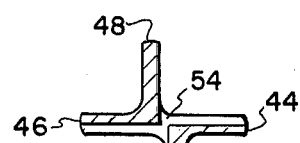 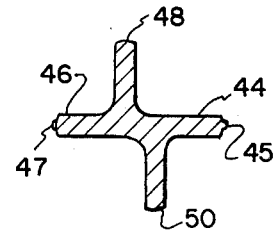 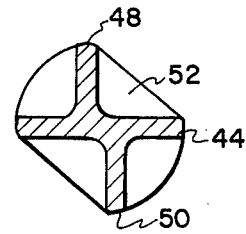
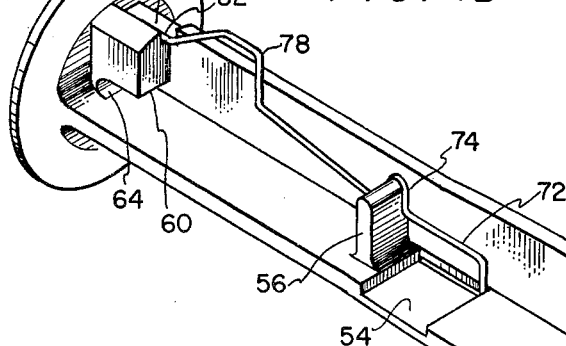
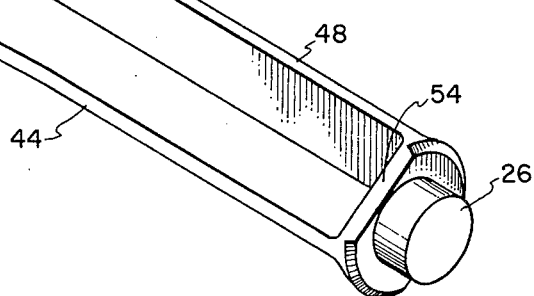

RECORD SPOOL HOLDER

BACKGROUND OF THE INVENTION

The present invention relates to recording apparatus. More particularly, it relates to a spindle assembly for a recording medium spool.

In the art relating to recorders of the type used for recording industrial or medical data, there are frequently charts or record media of different widths that may be selectively used. On some occasions, the narrower chart is preferred. On other occasions, the wider chart is indicated. In order to be able to use either chart on the one machine, with the chart centered, previous efforts have included relatively complex mechanisms to accomplish the accommodations and positioning of the record medium, or chart.

SUMMARY OF THE INVENTION

It is, accordingly, an object of the present invention to provide a recording apparatus with improved record media handling means.

It is another object of the present invention to provide a recording apparatus as set forth with improved means for handling record media of different widths.

It is a further object of the present invention to provide an improved record spool handling means for recording apparatus.

In accomplishing these and other objects, there has been provided, in accordance with the present invention, a recording apparatus having accommodations for receiving and retaining a spindle for a roll or spool of recording media. The spindle is characterized in that it has a shoulder at one end constituting a stop guide for a roll of recording medium of a first width. The spindle is also provided with a retractable stop member which, when extended, comprises a stop guide for a roll of chart recording medium of a predetermined narrower width. The spindle is contoured to firmly engage the core of a roll of record medium at about the mid point of the width dimension. The selected stop guides provide means for effectively centering either of the two different sized rolls with respect to the spindle. Special bracket members are provided whereby the spindle may be readily inserted and removed from the recording apparatus. The same brackets include an adjustment whereby to adjust the drag on the rolls.

BRIEF DESCRIPTION OF THE DRAWINGS

A better understanding of the present invention may be had from the following detailed description when read in the light of the accompanying drawings in which:

FIG. 1 is a side view of a portion of a recording apparatus embodying the present invention;

FIG. 2 is an isometric view of a spindle according to the present invention, with the retractable member extended;

FIGS. 4A through F are a succession of end or cross-sectional views of the spindle shown in FIG. 2; and FIG. 5 is a front view of the spindle of FIG. 2 shown with the retractable member retracted.

DETAILED DESCRIPTION

Figure 3:
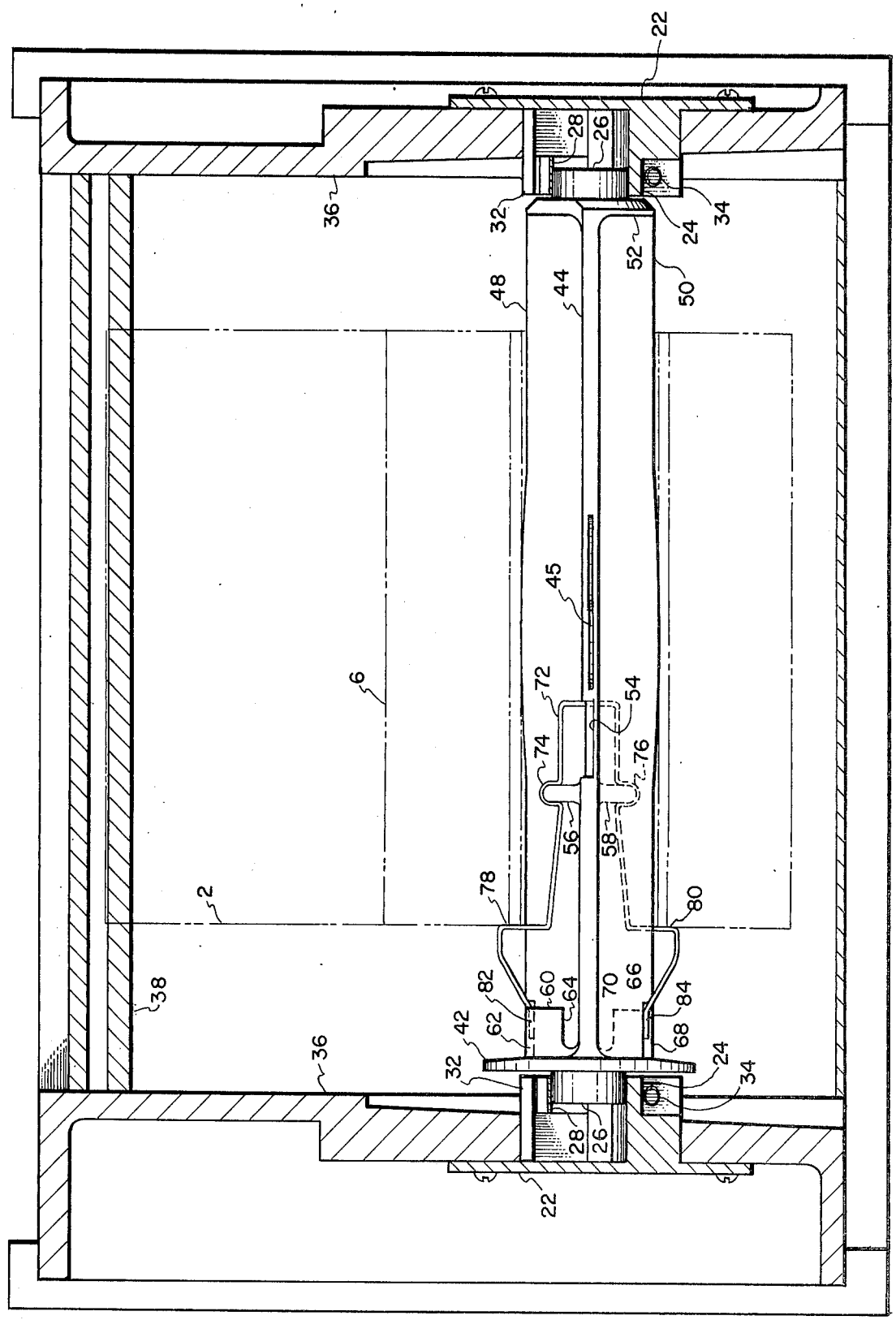
FIG. 3 is a front view of the spindle showing FIG. 2.

Referring now to the drawings in more detail, there is shown in FIG. 1 a recording apparatus wherein data is recorded on a light sensitive record member 2 by means of a cathode ray tube (CRT) 4. The record member 2 is drawn from a roll 6 over a first guide roller 8 and a second guide roller 10 by a drive roller 12. The web or record member is held in driving engagement with the drive roller 12 by a pressure roller 14. The pressure roller 14 is carried on arm 16, which is pivoted about a tubshaft 18 and is biased upwardly by a compression spring 20. One such spring biased support arm is positioned at and carries opposite ends of the pressure roller 14. While the arm 16 is schematically illustrated as being biased in the upward direction by a spring 20, it will be appreciated that other forms of spring biasing means would be equally effective in biasing the arm in the direction to firmly engage with the drive roller 12.

The roll 6 of the recording medium 2 is mounted on a spindle shown in detail later herein, which is carried on a pair of brackets 22 (one on each end). Each of the brackets 22 includes a cradle member 24 contoured to receive a cylindrical end shaft member 26 formed on each end of the spindle. The cradle member 24 is also provided with a tapered forward ramp surface to help guide the spindle end shafts 26 into the contoured recess. A retainer spring 28 is supported on a shoulder 30 of the cradle 24 and is held loosely in place by a boss 32. The relative positioning of the boss 32 and the shoulder 30 define a slot into which the retainer spring 28 is inserted. The spring 28 is in the form of a substantially L-shaped leaf spring having a depending leg which lies adjacent an end face of the cradle 24 and a retainer leg which overlies the recessed surface of the cradle 24 and is positioned to retain the spindle end shafts in the contoured recess of the cradle. An adjusting screw 34 extends through the end of the cradle member and engages the depending leg of the retaining spring 28. By adjusting the screw 34, the force applied to the top of the end shaft 26 of the spindle by the upper end of the spring 28 may be adjusted, thereby adjusting the drag tension in the record member 2 being withdrawn from the roll 6.

The brackets 22, the guide rollers 8 and 10 and the pressure roller assembly including the pressure roller 14, the arm 16 and the springs 20 are all preferably mounted in a module which is readily removable from and returned to the main body of the recording apparatus. The CRT 4 and the driving roller 12, the latter of which is driven by suitable driving power train not shown, are preferably mounted in the main body of the recorder structure. The module includes a pair of side panels 36. Extending between the side panels 36, there is a record guide platen 38 over which the exposed record member travels toward and exits from the machine at the lower end of the curved platen 38. A glass window 40 is positioned in front of the platen 38 with the record member passing between the platen 38 and the window 40. In one preferred embodiment of the present apparatus, wherein the record member 2 is a so-called direct print type record member, the transparent window 40 was of amber-colored glass.

In FIGS. 2 through 5, there is shown details of the spindle which forms a part of the present invention. The spindle comprises an elongated number generally cruciform in cross-section. The spindle assembly is provided with the end shaft member 26 at both ends thereof as previously mentioned. These are the shaft ends that support the spindle in the cradle 24 of the brackets 22. Immediately adjacent the left and end shaft 26 (as viewed in the drawings), there is a circular shoulder 42 of a diameter which is larger than the diameter of the core of the roll 6 of the recording member 2 which is to be carried by the spindle. The body of the spindle is comprised of four longitudinal fins, or ribs arranged in a substantially cruciform array. Two of the fins or ribs lie in a common plane embracing the axis of the spindle. The other two fins extend in opposite directions perpendicular to the plane of the first two fins but are slightly off-set with respect to each other relative to the axis of the spindle.

The end of the fins remote from the shoulder 42 terminate in an end web 52. The end web 52 is circularly arcuate between the web fins 44 and 50 and between the fins 46 and 48. The web is flat between the fins 44 and 48 and between 46 and 50. The flat surfaces of the end web 52 prevent the spindle from inadvertently rolling from a surface when placed thereon during a changing of rolls of recording media.

The length of the spindle between the inner surface of the shoulder 42 and the end web 52 is substantially equal to the width of the widest roll of the record medium to be accommodated on the recording apparatus, e.g. eight inches. The center portion of the spindle has the fins of slightly wider dimension than at the end portions. Additionally, the fins 44 and 46 are provided at the same center portion with a bead 45, 47 extending from the edges thereof. The slightly wider fins at the center portion of the spindle provide a firm support at the midpoint of a roll of record medium mounted on the spindle. The small bead 45, 47 superimposed upon the two fins 44 and 46 provide a measure of torsional gripping of the core of the roll 6 of record medium 2.

In a position intermediate the midpoint of the spindle and the shoulder 42, there is provided a slot 54 through the plane defined by the fins 44 and 46 as shown in FIG. 4D. Adjacent the slot 54, there is provided a first boss 56 extending upwardly from the fin 44 and adjacent the fin 48. A similar boss 58 is provided extending downwardly from the fin 46 and adjacent the fin 50, as shown in FIG. 4C. Adjacent the circular shoulder 42, the fin 48 is thickened to form a further boss 60 projecting in the direction of the fin 44 on the opposite side of the median plane defined by the center line of the spindle and lying perpendicular to the plane of the fins 44 and 46, the boss extending a distance substantially equal to the displacement of the fin 48. A notch 62 is formed in the top of the boss 60 as shown in FIG. 4B. Further the boss 60 is undercut in a direction parallel to the surface of the fin 44 and coextensive therewith to form another notch 64. A similar boss 66 is formed extending outwardly from the fin 50 in the direction of the fin 46. A peripheral notch 68 is formed in the top of the boss 66 corresponding to the notch 62 in the boss 60. Again, a lateral notch 70 corresponds to the notch 64 on the boss 60.

A spring 72 which is basically U-shaped and symmetrically contoured about a center line has one leg thereof extending along the fins 48 and 50 with the base of the U-shaped portion extending through the slot 54. Each leg of the spring is provided with an outwardly extending U-shaped bend. The U-shaped bend 74 of one leg engages the first boss 56 while the U-shaped bend 76 in the other leg engages the boss 58. The engagement of the U-shaped bends 74, 76 with the bosses 56, 58, fixes the longitudinal position of the spring 72 relative to the longitudinal axis of a spindle. At a predetermined distance from the U-shaped bends 74 and 76, the spring is configured to 78 to form a substantially right angled shoulder 78, 80, in each leg of the spring, the shoulder extending in the same direction as the U-shaped bends 74 and 76 respectively. The ends of the two legs of the spring, following the right angle shoulder are bent back toward the axis of symmetry of the U-shaped spring to form end tabs 82, 84, respectively.

It was previously noted that the present apparatus is adapted to be used with rolls of record number of either of two predetermined widths. In order to accommodate a roll of the larger of the two widths, as previously suggested eight inches, the spring 72 is arranged to be retracted as shown in FIG. 5. In the retracted arrangement, the shoulders 78 and 80 are depressed and the tab ends 82, 84 of the spring 72 are hooked under the bosses 60 and 66 in the notches 64 and 70, respectively. In that position, the shoulders 78 and 80 are held in an innermost position not extending beyond the edges of the fins 48 and 50 respectively. This allows the core of the roll 6 of the record medium 2 to be slid onto the spindle, past the spring shoulders 78 and 80 and to abut against the inner surface of the circular shoulder 42. That shoulder 42 is positioned to cause the wider roll of record media to be centered relative to the recording apparatus. The slightly larger dimension of the fins at the center portion of the spindle provides a support for the roll at the median line thereof.

On the other hand, when it is desired to use a narrower roll of recording medium, for example, a six inch wide record member, the ends 82, 84 of the spring 72 are disengaged from the notches 64 and 70 and are, instead, set in the upper notches 62 and 68, respectively. In this position, the shoulders 78 and 80 extend above the outer edges of the fins 48 and 50, respectively, at substantially right angles to the axis of the spindle. As was previously mentioned, the U-shaped bends 74 and 76 cooperating with the bosses 56 and 58, respectively, establish the longitudinal position of the spring 72 relative to the spindle. In the illustrative example wherein the narrower roll of record medium is a six inch roll, whereas the wider roll had been an eight inch roll, the shoulders 78 and 80 are formed to be positioned one inch from the inner face of the circular shoulder 42. Thus, positioned and in the extended condition, when the narrower role of record medium is placed on the spindle, the edge of the roll abuts the shoulders 78 and 80 causing that narrower roll to be centered on the spindle and thereby centered relative to the recording apparatus. Again, the slightly larger dimension of the fins at the center portion thereof support the narrower roll at the record medium at the median line thereof.

Thus, it may be seen that there has been provided, in accordance with the present invention, a recording apparatus with improved record media handling means which includes simple and inexpensive means for accommodating and centering rolls of record medium of different widths.

The embodiments of the invention in which an exclusive property or privilege is claimed are defined as follows:

1. A recording apparatus comprising:
a recording station,
means for drawing a recording medium from a supply roll past said recording station,
means for mounting a supply roll of recording medium of either of two predetermined widths in said recording apparatus,
said means for mounting said supply roll including:
a spindle for holding said supply roll, said spindle having an elongated body member having an end shaft member at each end thereof, said body member including a plurality of ribs defining a substantially cruciform cross-section and extending axially of said spindle for a distance substantially equal to the width of the wider of the two rolls of recording media, said ribs terminating at one end in a collar extending radially outward to a dimension greater than the radial dimension of said ribs to define a first end stop for positioning said wider roll on said spindle, and a retractable second end stop member positioned a predetermined distance from said first end stop for positioning the narrower one of said two rolls of recording media; and bracket means in said recording apparatus for removably receiving said end shaft members of said spindle.

2. The recording apparatus of claim 1 wherein said bracket means each include a cradle member for receiving said end shaft members of said spindle, a retainer spring positioned relative to said cradle member to retain said end shaft members in said cradle numbers, and adjusting screw means for adjusting the retaining force, hence the drag of said retaining springs on said end shaft members.

3. In a recording apparatus, a spindle for holding a roll of recording media of either of two predetermined widths, said spindle comprising:

an elongated body member having an end shaft member at each end thereof for mounting said spindle in said recording apparatus, said body member including a plurality of ribs defining a substantially cruciform cross-section and extending axially of said spindle for a distance substantially equal to the width of the wider of the two rolls of recording media, said ribs terminating at one end in a collar extending radially outward to a dimension greater than said ribs to define a first end stop for positioning said wider roll on said spindle, and a retractable second end stop member positioned a predetermined distance from said first end stop for positioning the narrower of said two rolls of recording media.

4. In a recording apparatus, a spindle for holding a roll of recording media of either of two predetermined widths, said spindle comprising:

an elongated body member having an end shaft member at each end thereof for mounting said spindle in said recording apparatus, said body member including a plurality of ribs defining a substantially cruciform cross-section and extending axially of said spindle a distance substantially equal to the width of the wider one of the two rolls, said ribs terminating at one end in a collar extending radially outward to a dimension greater than said ribs to define a first end stop for positioning said wider roll on said spindle, a retractable second end stop member positioned a predetermined distance from said first end stop for positioning the narrower of said two rolls of recording media, and means for selectively retaining said retractable stop member in either a retracted or an extended position.

5. In a recording apparatus, a spindle for holding a roll of recording media of either of two predetermined widths, said spindle comprising:

an elongated body member having an end shaft member at each end thereof for mounting said spindle in said recording apparatus;

said body member including a plurality of ribs defining a substantially cruciform cross-section and extending axially of said spindle a distance substantially equal to the width of the wider one of the two rolls, said ribs terminating at one end in a collar extending radially outward to a dimension greater than said ribs to define a first end stop for positioning said wider roll on said spindle, a retractable second end stop member positioned a predetermined distance from said first end stop for positioning the narrower of said two rolls of recording media; said retractable second end stop member comprising a spring member configured to provide a pair of shoulders defining the end stop for said narrower roll; and means for selectively retaining said retractable stop member in either a retracted or an extended position.

6. In a recording apparatus, a spindle for holding a roll of recording media of either of two predetermined widths, said spindle comprising:

an elongated body member having an end shaft member at each end thereof for mounting said spindle in said recording apparatus, said body member including a plurality of ribs defining a substantially cruciform cross-section and extending axially of said spindle a distance substantially equal to the width of the wider one of the two rolls, said ribs terminating at one end in a collar extending radially outward to a dimension greater than said ribs to define a first end stop for positioning said wider roll on said spindle, said ribs being slightly larger in a radial direction in the vicinity of the axial midpoint thereof to provide median support for said roll of recording medium, a retractable second end stop member positioned a predetermined distance from said first end stop for positioning the narrower of said two rolls of recording media on said spindle, said retractable second end stop member comprising a spring member configured to provide a pair of shoulders defining the end stop for said narrower roll, and means for selectively retaining said retractable stop member in either a retracted or an extended position.

7. The spindle as set forth in claim 6 wherein said spring member comprising retractable end stop member is substantially U-shaped, said spindle having a slot therethrough intermediate said mid point and said collar, said U-shaped spring having the base thereof extending through said slot, said spindle having a first and second boss extending from said ribs and perpendicular to said ribs, said bosses being positioned intermediate said slot and said collar, each leg of said U-shaped spring being further configured with a U-shaped bend extending radially with respect to said spindle, said U-shaped bends being positioned over said first and second boss, respectively, whereby to establish the axial position of said second end stop member relative to said spindle.

8. The spindle as set forth in claim 7 wherein a pair of bosses are provided at the ends of said ribs adjacent said collar, each of said last mentioned bosses having an axial notch on the radially outer surface thereof, said axial notches being arranged to receive the extremeties of said spring member to retain said retractable end stop member in said extended position and said last mentioned bosses each having an undercut notch also arranged to receive the extremities of said spring member to retain said retractable end stop member in said retracted position.

* * * * *